April 24, 1951

A. KOST 2,549,823

SET SCREW LOCKING MEANS

Filed Nov. 18, 1946

INVENTOR.
Alwin Kost
BY
Fred C. Matheny
ATTORNEY

Patented Apr. 24, 1951

2,549,823

UNITED STATES PATENT OFFICE 2,549,823

SETSCREW LOCKING MEANS

Alwin Kost, Portland, Oreg.

Application November 18, 1946, Serial No. 710,523

1 Claim. (Cl. 85—1)

This invention relates to a set screw locking means.

An object of this invention is to provide set screw locking means for use between the end of a set screw and another fixed part to lock the set screw.

Another object is to provide set screw locking means that will effectively lock a set screw against loosening by vibration or shock and yet will allow the set screw to be unscrewed in the usual manner by the application of wrench or like means thereto.

Another object of this invention is to provide a set screw locking device comprising a hat shaped body having a set screw abutment member on one side thereof and having an annular flange extending outwardly from said abutment member and further having integral, resilient, inclined pawls projecting from said flange on the side opposite said set screw abutment member.

Other objects of the invention will be apparent from the following description taken in connection with the accompanying drawings.

In the drawings.

Like reference numerals designate like parts throughout the several views.

Figure 1:
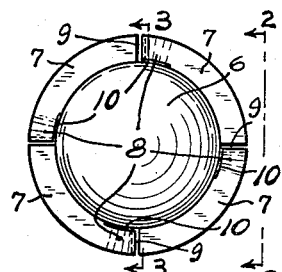
Figure 1 is a plan view of a set screw locking device constructed in accordance with this invention.

Figs. 1 to 4 inclusive show a preferred embodiment of my invention in the nature of a one piece set screw locking device shaped somewhat like a hat.

This locking device comprises a dome shaped set screw abutment member 6 having an annular flange 7. The flange 7 has a plurality of resilient inclined pawls 8. The pawls 8 are preferably formed by providing radial cuts 9 and short cylindrical cuts 10 in L-shaped formation in the flange 7 so that each pair of cuts 9 and 10 define one end and one side of each pawl 8. The portions thus cut along one end and one side are bent outwardly so that the pawls 8 protrude in the opposite direction from the set screw abutting member 6.

Figure 2:
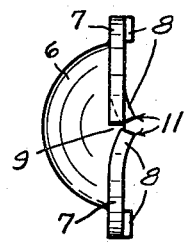
Figure 2 is a side elevation of the same looking in the direction of line 2—2 of Fig. 1.
Figure 3:
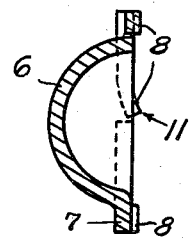
Figure 3 is a sectional view taken substantially on broken line 3—3 of Fig. 1.

Each pawl 8 has a relatively sharp edge 11 that tends to dig into any member against which it is pressed. Also each pawl 8 is resilient so that if it is sprung back into or near its original position in the plane of the flange 7, as shown in Fig. 4, it will tend to return to the position in which it is shown in Figs. 1, 2 and 3.

The drawings show a device in which four pawls 8 are provided but it will be understood that the number of these pawls can be varied as desired.

Figure 4:
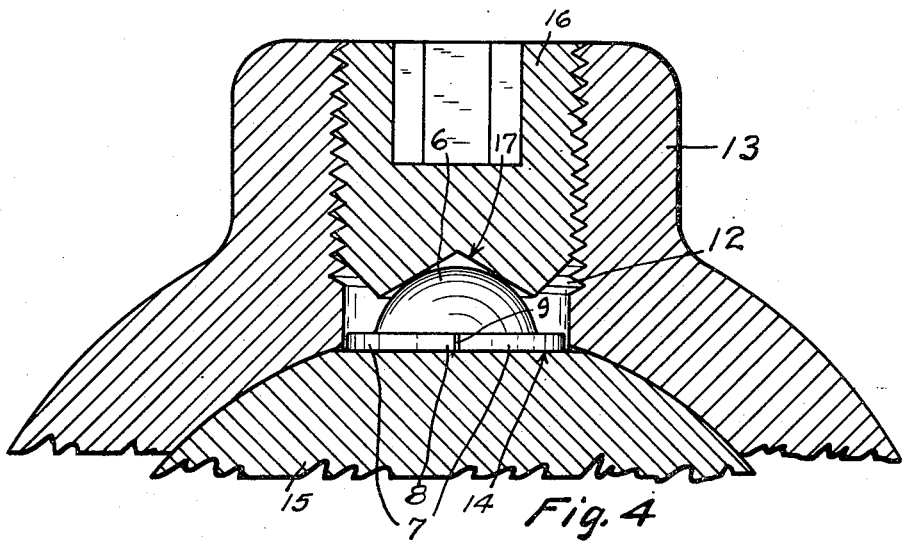
Figure 4 is a view partly in section and partly in elevation showing this set screw locking device in an operative position locking a set screw in a member into which the set screw is threaded.

One method of using this locking device is illustrated in Fig. 4 in which the device is positioned in an internally threaded opening 12 in a sleeve member 13 with the side thereof from which the pawls 8 protrude resting on a flattened portion 14 of a shaft 15. A set screw 16 having a concave depression 17 in its inner end is screwed into the opening 12 and tightened against the locking device sufficiently to lock the shaft 15 and sleeve 13 together. This tends to spring the resilient pawls 8 back into a position in or near the plane of the flange 7 and causes said pawls 8 to exert a strong outward pressure on the set screw 16 so that the threads of this set screw 16 bind tightly against the threads of the sleeve 13 and the set screw 16 is effectively locked so that it will not be loosened by vibration.

At the same time the corners 11 on the forward ends of the pawls 8 will tend to dig into the surface 14 against which they are pressed and these corners 11 extend in the proper direction to resist unscrewing of the set screw 16, depending upon the direction of the thread of said screw. The abutment member 6 is sufficiently strong so that any desired amount of pressure can be exerted through this abutment member against the surface 14.

This locking device can be advantageously used between a set screw and a key on a shaft to hold the key tight and to prevent the part to which the key is applied from being moved by vibration.

The foregoing description and accompanying drawings clearly disclose preferred embodiments of this invention but it will be understood that changes in this device can be made within the scope and spirit of the following claim.

I claim:

A set screw locking device comprising an annular flange of resilient metal; a centrally positioned hollow dome-shaped set screw abutment member of resilient metal, said flange and abutment member being of uniform thickness with the abutment member integral with said flange and protruding in one direction therefrom; and a plurality of pawl members integral with said flange and extending at an angle from the side of said flange opposite to said set screw abutment member, said pawl members functioning to exert an outward pressure and to resist turning movement of said set screw locking device when said set screw locking device is interposed between a set screw and a member that is to be locked and said hollow resilient dome-shaped set screw abutment member serving to disperse and disrupt vibrations which move outwardly toward the set screw, whereby these vibrations will be ineffective to loosen the set screw.

ALWIN KOST.

REFERENCES CITED

The following references are of record in the file of this patent:

UNITED STATES PATENTS

| Number | Name | Date |
| --- | --- | --- |
| 1,346,867 | Weibull | July 20, 1920 |
| 1,878,425 | Olson | Sept. 20, 1932 |
| 1,956,745 | Payne | May 1, 1934 |